(12) United States Patent
Xu

(10) Patent No.: US 11,484,021 B2
(45) Date of Patent: Nov. 1, 2022

(54) FISH GRIP HAVING TOUCH CONTROL LOCKING MECHANISM

(71) Applicant: YANGZHOU YUANSHENG MACHINERY CO., LTD., Yangzhou (CN)

(72) Inventor: Zhilin Xu, Yangzhou (CN)

(73) Assignee: YANGZHOU YUANSHENG MACHINERY CO., LTD., Yangzhou (CN)

( * ) Notice: Subject to any disclaimer, the term of this patent is extended or adjusted under 35 U.S.C. 154(b) by 179 days.

(21) Appl. No.: 16/754,750

(22) PCT Filed: Nov. 21, 2017

(86) PCT No.: PCT/CN2017/112058
§ 371 (c)(1),
(2) Date: Apr. 9, 2020

(87) PCT Pub. No.: WO2019/095400
PCT Pub. Date: May 23, 2019

(65) Prior Publication Data
US 2020/0315153 A1     Oct. 8, 2020

(30) Foreign Application Priority Data

Nov. 14, 2017 (CN) .......................... 201711121521.2
Nov. 14, 2017 (CN) .......................... 201721513030.8

(51) Int. Cl.
*A01K 97/18* (2006.01)
(52) U.S. Cl.
CPC ................................... *A01K 97/18* (2013.01)

(58) Field of Classification Search
CPC ...................................................... A01K 97/18
(Continued)

(56) References Cited

U.S. PATENT DOCUMENTS 674,865 A * 5/1901 Harrington ............... A01K 1/04
119/791
755,726 A * 3/1904 Ward ...................... A01K 83/04
43/37

(Continued)

FOREIGN PATENT DOCUMENTS

CN 203590865 U 5/2014
CN 203801549 U 9/2014
(Continued)

*Primary Examiner* — Darren W Ark
(74) *Attorney, Agent, or Firm* — Bayramoglu Law Offices LLC

(57) ABSTRACT

A fish grip having a touch control locking mechanism includes a base. A front end of the base is provided with a left gripper and a right gripper that cooperate with each other. A locking member is movable relative to the base for locking a trigger when the left gripper and the right gripper are in an open position. A triggering member is also connected to the base for automatically triggering the locking member when the left gripper or the right gripper extends into the mouth of a fish thus driving the left gripper and the right gripper to a closed position. During use, the trigger is pulled or pushed to open the left gripper and the right gripper, and the trigger may be locked by the locking member to maintain the open position of the left and right gripper.

9 Claims, 6 Drawing Sheets

(58) Field of Classification Search
USPC ............. 43/53.5, 5; 294/86.14, 86.26, 86.27, 294/86.29, 86.3, 86.31, 103.1, 104, 105, 294/115, 116
See application file for complete search history.

(56) References Cited

U.S. PATENT DOCUMENTS

| | | | | |
|---|---|---|---|---|
| 1,049,875 A * | 1/1913 | Krueger | ................ | A01K 97/14 294/19.3 |
| 1,080,868 A * | 12/1913 | Turner | ................ | A01K 97/14 294/19.3 |
| 1,148,740 A * | 8/1915 | Batla | ................ | A01K 83/04 43/37 |
| 1,878,951 A * | 9/1932 | Madison | ................ | A01K 81/00 294/115 |
| 1,941,064 A * | 12/1933 | Wendt | ................ | A47G 21/10 119/806 |
| 2,162,241 A * | 6/1939 | Boyce | ................ | A01K 83/04 43/37 |
| 2,196,117 A * | 4/1940 | Lange | ................ | A01K 97/14 43/104 |
| 2,553,235 A * | 5/1951 | Brace | ................ | A01K 97/14 294/19.3 |
| 2,747,321 A * | 5/1956 | Thompson | ............. | A01K 97/18 43/53.5 |
| 2,867,937 A * | 1/1959 | Little | ................ | A01K 97/18 43/53.5 |
| 2,891,275 A * | 6/1959 | Schuls | ................ | A22C 25/06 43/53.5 |
| 2,930,648 A * | 3/1960 | Allan | ................ | A01K 97/14 294/115 |
| 2,978,269 A * | 4/1961 | Karlsson | ................ | A01K 97/14 294/50.6 |
| 3,208,786 A * | 9/1965 | Eddleman | ............. | B65D 25/08 294/115 |
| 3,267,603 A * | 8/1966 | Josephs | ................ | A01K 97/14 43/5 |
| 3,833,252 A * | 9/1974 | Redding | ................ | A01K 97/14 294/100 |
| 3,844,602 A * | 10/1974 | Johansson | ................ | A01K 97/14 294/104 |
| 3,978,605 A * | 9/1976 | Maruniak | ............. | A01K 97/14 294/115 |
| 3,986,287 A * | 10/1976 | Arteaga | ................ | A01K 97/14 294/19.3 |
| 4,152,859 A * | 5/1979 | Hansen | ................ | A01K 97/24 43/17.2 |
| 4,783,926 A * | 11/1988 | McKinney | ............ | A01K 97/14 294/19.3 |
| 4,845,876 A * | 7/1989 | Dodson | ................ | A01K 97/14 43/5 |
| 4,934,089 A * | 6/1990 | Samar | ................ | A01K 97/14 294/111 |
| 4,938,517 A * | 7/1990 | Langloy | ................ | B66C 1/48 294/104 |
| 5,048,221 A * | 9/1991 | Kunkel | ................ | A01K 97/14 43/6 |
| 5,058,306 A * | 10/1991 | Sienel | ................ | A01K 97/14 294/107 |
| 5,119,585 A * | 6/1992 | Camp | ................ | G01G 19/60 177/148 |
| 5,174,057 A * | 12/1992 | Sienel | ................ | A01K 97/14 294/107 |
| 5,704,156 A * | 1/1998 | DiLello | ................ | A01K 97/14 294/19.3 |
| 5,832,651 A * | 11/1998 | Arntz | ................ | A01K 97/14 294/19.3 |
| 6,389,731 B1 * | 5/2002 | Freeman | ............... | A01K 97/18 43/53.5 |
| 6,438,891 B1 * | 8/2002 | Aboczky | ............... | A01K 97/14 43/53.5 |
| 6,560,913 B1 * | 5/2003 | Liao | ................ | A01K 97/14 177/148 |
| 6,571,505 B1 * | 6/2003 | Poiencot, Jr. | ......... | A01K 97/14 119/806 |
| 6,943,304 B1 * | 9/2005 | Brady | ................ | G01G 19/60 177/148 |
| 6,968,644 B1 * | 11/2005 | Garcia | ................ | A01K 97/18 606/205 |
| 7,076,910 B1 * | 7/2006 | Xifra | ................ | A01K 97/14 177/148 |
| 7,275,777 B1 * | 10/2007 | Urdiales | ................ | B65G 7/12 294/16 |
| 7,478,497 B2 * | 1/2009 | Otsuka | ................ | A01K 97/14 177/148 |
| 8,806,800 B2 * | 8/2014 | Hupp | ................ | A01K 97/00 43/53.5 |
| 2005/0189153 A1 * | 9/2005 | Yang | ................ | A01K 97/14 177/148 |
| 2006/0162229 A1 * | 7/2006 | Otsuka | ................ | A01K 97/14 177/245 |

FOREIGN PATENT DOCUMENTS

| | | | |
|---|---|---|---|
| CN | 204811586 U | | 12/2015 |
| CN | 206365378 U | * | 8/2017 |
| CN | 206365378 U | | 8/2017 |
| JP | 2018186791 A | * | 11/2018 |

* cited by examiner

FISH GRIP HAVING TOUCH CONTROL LOCKING MECHANISM

CROSS REFERENCE TO THE RELATED APPLICATIONS

This application is the national phase entry of International Application No. PCT/CN2017/112058, filed on Nov. 21, 2017, which is based upon and claims priority to Chinese Patent Application No. 201721513030.8, filed on Nov. 14, 2017, and Chinese Patent Application No. 201711121521.2, filed on Nov. 14, 2017, the entire contents of which are incorporated herein by reference.

TECHNICAL FIELD

The present invention relates to the field of fishing tackle, and more specifically, relates to a fish grip having a touch control locking mechanism.

BACKGROUND

A fish grip is a kind of fishing tackle that has become increasingly popular among fishing enthusiasts. Commonly used fish grips are maintained in an open position by manual control, resulting in an inconvenient user experience. Moreover, a continuous manual control, such as pulling a trigger for a long time can easily cause fatigue and lasting pain and damage to a user's hand and finger. Additionally, present fish grips require the user to contact the fish, which to some users may be undesirable.

SUMMARY

The present invention provides a fish grip having a touch control locking mechanism, which enables remote fish gripping and greatly reduces the fatigue of a user caused by pulling a trigger for extended periods.

The technical solutions to achieve the above objectives are as follows. A fish grip having a touch control locking mechanism includes a base, wherein the front end of the base is provided with a left gripper and a right gripper that cooperate with each other, a trigger for driving the left gripper and the right gripper to depart from each other toward an open position is further connected in the base, and a first elastic member is provided between the trigger and the base to drive the left gripper and the right gripper to approach each other automatically toward a closed position;

the base is further movably connected to a locking member for locking a position of the trigger when the left gripper and the right gripper are in an open position, a second elastic member is connected between the locking member and the base, and the second elastic member is configured to keep the locking member in a position of locking the position of the trigger; and a triggering member is further connected to the base, and the triggering member is configured to automatically trigger the locking member after the left gripper or the right gripper reaches into a fish mouth, so that the trigger resets driven by the first elastic member, thereby closing the left gripper and the right gripper.

The advantages of the present invention are as follows: during use, the trigger is pulled or pushed to open the left gripper and the right gripper, and meanwhile, the position of the trigger is locked by the locking member, maintaining the open position of the left gripper and the right gripper. There is no need to continuously push the trigger forward by the user to keep the open position, which greatly reduces the fatigue caused by pulling the trigger for a long time.

The triggering member is designed to allow the left gripper and the right gripper to be automatically locked, facilitating use and the remote fish gripping.

Further, one of the left gripper and the right gripper is a fixed gripping head, and the other is a movable gripping head.

Further, the left gripper and the right gripper are both movable gripping heads.

Further, a middle portion of the trigger is provided with a first sliding groove extending forward, a first guiding pin cooperating with the first sliding groove is provided on the base, a second bolt is connected to the front end of the trigger, a second sliding groove extending forward is further provided on the base, an arc-shaped groove is provided on the movable gripping head, and the second bolt slidably cooperates with the second sliding groove and the arc-shaped groove simultaneously.

During use, the trigger is pushed or pulled to drive the second bolt forward or backward and drive the left gripper and the right gripper to open under a combined action of the second sliding groove and the arc-shaped groove.

Further, the left gripper and the right gripper are connected to the front end of the base through a rotating shaft, and a connecting shaft is provided on the base at the rear side of the left gripper and the right gripper, a third sliding groove extending forward is provided on the trigger on the rear side of the connecting shaft, the connecting shaft is fitted and provided in the third sliding groove, and the front end of the trigger is connected to the rotating shaft, and a second guiding pin cooperating with the third sliding groove is provided on the base.

During use, the trigger is pulled to drive the left gripper and the right gripper backward and drive the left gripper and the right gripper to open under an action of the connecting shaft.

Further, a fixture hook and a fixture block that cooperate with each other are provided between the locking member and a side wall of the trigger, the fixture hook is attached on the side wall of the trigger where the fixture block is arranged under an action of the second elastic member, and when the left gripper and the right gripper are in the open position, the fixture hook is hooked on the fixture block to keep the left gripper and the right gripper in the open position.

Further, the locking member is rotationally connected in the base through a fourth bolt, the triggering member is L-shaped, and the vertical section of the triggering member and the front end of the locking member form an integrated structure, the horizontal section of the triggering member is horizontally provided on the side of the left gripper or the right gripper, so that when the left gripper or the right gripper is extended into the fish mouth, the horizontal section of the triggering member can be rotated to separate the fixture hook and the fixture block that are engaged with each other.

Further, the locking member is horizontally movably connected in the base, the triggering member is L-shaped, the horizontal section of the triggering member is horizontally provided on the side of the left gripper or the right gripper, so that when the fixed gripping head or the movable gripping head extends into the fish mouth, the vertical section of the triggering member can be pushed to push the locking member downward to move out laterally, so as to separate the fixture hook and fixture block that are engaged with each other.

The locking member is rotationally connected in the base through a fourth bolt, the triggering member is L-shaped and is slidably mounted on the base through a fourth sliding groove and a third guiding pin that cooperate with each other, an end of the triggering member abuts in the locking member backward, the horizontal section of the triggering member is horizontally provided on a side of the left gripper or the right gripper, so that when the left gripper or the right gripper extends into the fish mouth, the horizontal section of the triggering member can be pushed to drive the locking member to move backward, so as to separate the fixture hook and fixture block that are engaged with each other; a third elastic member configured to reset forward is provided between the triggering member and the base.

DETAILED DESCRIPTION OF THE EMBODIMENTS

Embodiment 1

Figure 1:
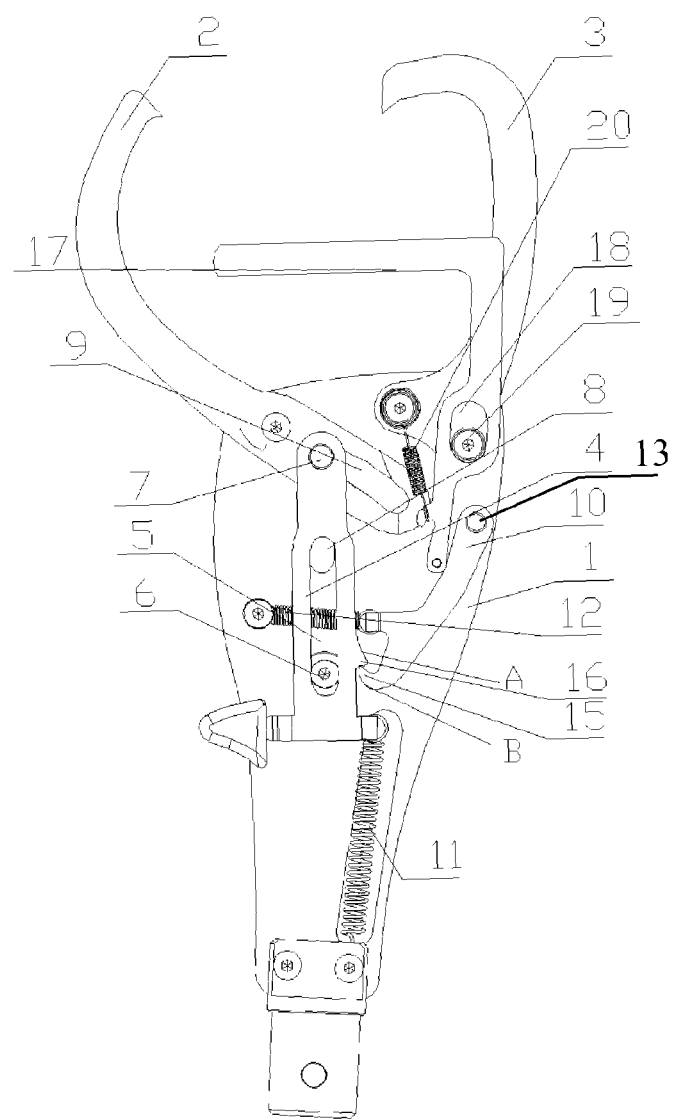
FIG. 1 is a schematic diagram showing a structure of embodiment 1.
Figure 2:
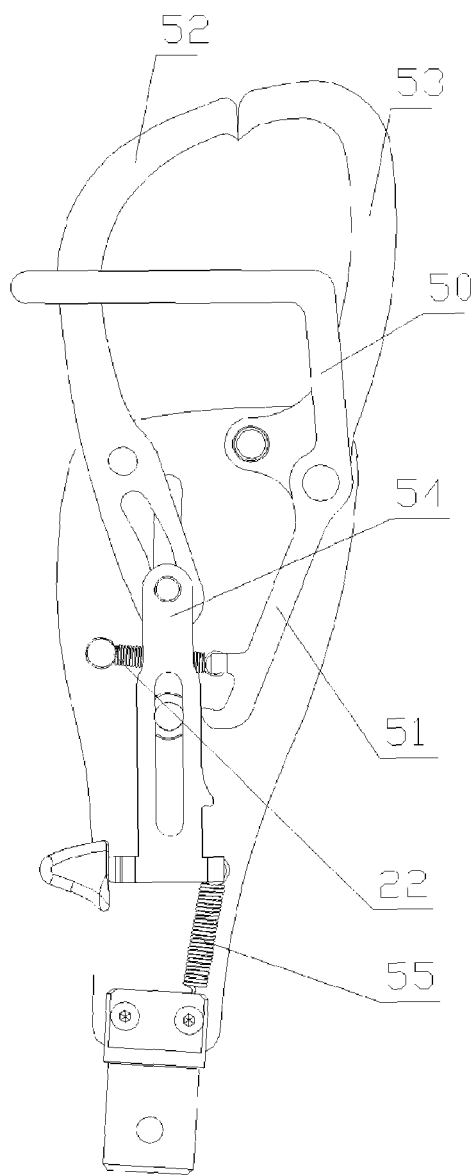
FIG. 2 is a schematic diagram showing a structure of embodiment 2 in a closed position.

As shown in FIG. 1, a fish grip having a touch control locking mechanism includes the base 1. The base 1 is a clamping plate with two layers provided at intervals and connected to each other. The front end of the base 1 is provided with the left gripper 2 and the right gripper 3 that cooperate with each other, wherein the left gripper 2 is a movable gripping head, and the right gripper 3 is a fixed gripping head. The base 1 is further connected to the trigger 4 for opening the left gripper 2. The first elastic member 11 is connected between the rear end of the trigger 4 and the rear end of the base 1, and the first elastic member 11 is a tension spring.

The middle portion of the trigger 4 is provided with the first sliding groove 5 extending forward. The base 1 is provided with the first guiding pin 6 cooperating with the first sliding groove 5. The front end of the trigger 4 is connected to the second bolt 7. The second slide groove 8 extending forward is provided on the base 1. The arc-shaped groove 9 is provided on the left gripper 2. The second bolt 7 slidably cooperates with the second slide groove 8 and the arc-shaped groove 9 simultaneously.

The base 1 is further rotatably connected to the locking member 10 for locking the trigger 4 when the left gripper 2 and the right gripper 3 are in an open position through the fourth bolt 13. The second elastic member 12 is connected between the locking member 10 and the base 1. The second elastic member 12 is a tension spring. The fixture hook 15 is provided at the lower end of the locking member 10. The fixture block 16 that cooperates with the fixture hook 15 is provided on a side wall of the trigger 4. The fixture hook 15 is attached on the side wall of the trigger 4 under the action of the second elastic member 12. The A side of the fixture hook 15 and the B side of the fixture block 16 are inclined surfaces that fit with each other, so that when the fixture block 16 runs upward, the trigger 4 can be pushed rightward to rotate counterclockwise, allowing the fixture hook 15 to be hooked on the fixture block 16.

The fish grip is further provided with the triggering member 17. The triggering member 17 is L-shaped, and the middle portion thereof is slidably mounted in the base 1 through the fourth sliding groove 18 and the third guiding pin 19 that cooperate with each other. One end of the triggering member 17 abuts against the locking member 10 backward, and the horizontal section of the triggering member 17 is horizontally provided on one side of the left gripper 2 or the right gripper 3, so that when the left gripper 2 or the right gripper 3 extends into a fish mouth, the horizontal section of the triggering member can push the locking member 10 to rotate backward, thus separating the fixture hook 15 and the fixture block 16 that are engaged with each other. The third elastic member 20 is provided between the triggering member 17 and the base 1 to reset forward.

In the normal position, the first elastic member 11 pulls the trigger 4 to make the left gripper 2 and the right gripper 3 in a closed position. The fixture hook 15 is attached on the side wall of the trigger 4 under the action of the second elastic member 12.

During use, the trigger 4 is pushed upward to drive the second bolt 7 forward and drive the left gripper 2 to rotate counterclockwise to open under the combined action of the second sliding groove 8 and the arc-shaped groove 9. Then, the trigger 4 is pushed forward to open the left gripper 2 to the maximum degree, and meanwhile, the fixture hook 15 is hooked on the fixture block 16 to keep the left gripper 2 and the right clamping head 3 in the open position.

When gripping a fish, the left gripper 2 or the right gripper 3 is extended into the fish mouth. When the fish lip touches the triggering member 17, the triggering member 17 drives the lock member 10 backward to rotate counterclockwise. Then, the fixture hook 15 and the fixture hook 16 are disengaged, and the trigger 4 is reset under the action of the first elastic member 11, thereby closing the left gripper 2 and the right gripper 3, and completing the fish gripping.

Embodiment 2

As shown in the figure, the structure of embodiment 2 is almost the same as that of embodiment 1, except that: the triggering member 50 is L-shaped, and the vertical section of the triggering member 50 and the front end of the locking member 51 form an integrated structure. The horizontal section of the triggering member 50 is horizontally provided on one side of the left gripper 52 and the right gripper 53, so that when the left gripper 52 or the right gripper 53 is extended into the fish mouth, the horizontal section of the triggering member 50 is pushed to rotate, thereby driving the locking member 51 to rotate counterclockwise and resetting the trigger 54 under the action of the first elastic member 55, thus driving the left gripper 2 and the right gripper 3 to close.

Figure 3:
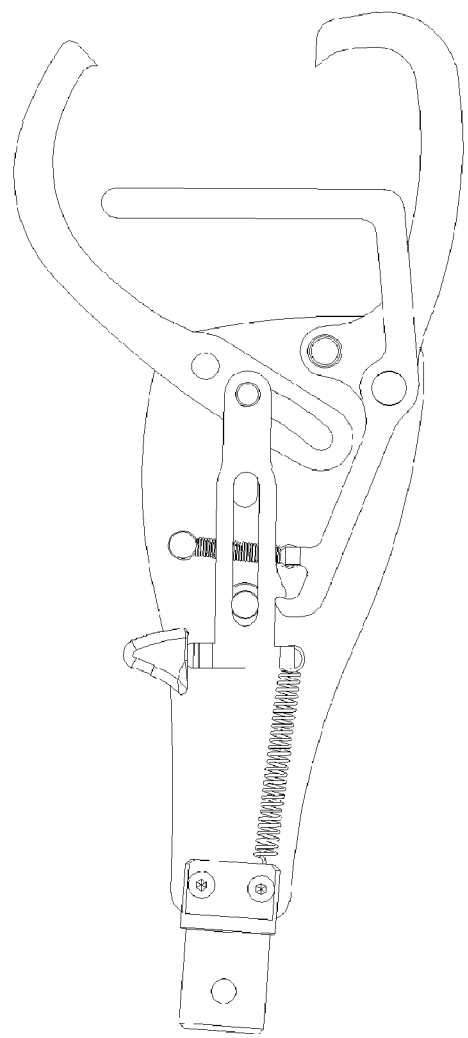
FIG. 3 is a schematic diagram showing the structure of embodiment 2 in an open position.

FIG. 3 is a structural diagram of the left gripper 52 and the right gripper 53 in embodiment 2 in an open position. The specific principle is the same as that of embodiment 1, and is not repeated herein.

Embodiment 3

Figure 4:
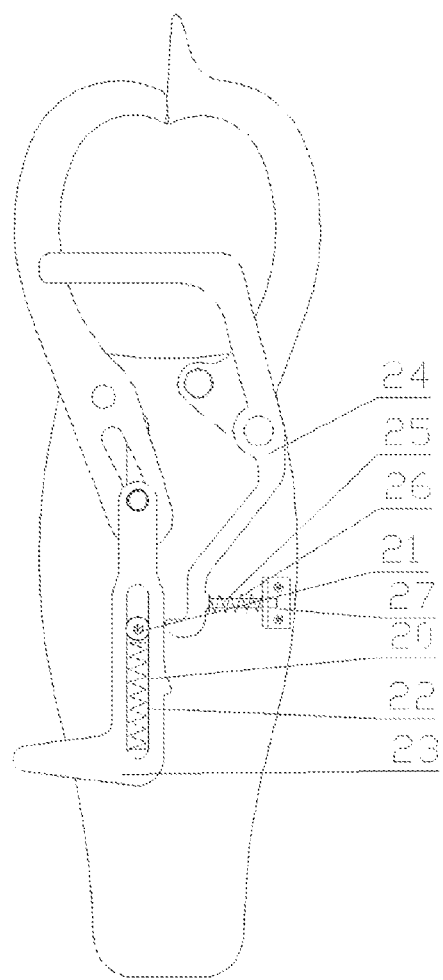
FIG. 4 is a schematic diagram showing a structure of embodiment 3.

As shown in FIG. 4, the structure of embodiment 3 is almost the same as that of embodiment 2, except that: the first elastic member 20 is a compression spring, where one end of the compression spring 20 is connected to the first guiding pin 21, and the other end is connected to the rear end of the first sliding groove 23 of the trigger 22.

The second elastic member 26 is a compression spring. The locking member 24 is provided with the guiding rod 25 and the guiding base 27 that cooperates with the guiding rod 25. The guiding rod 25 slidably passes through the guiding base 27, and the second elastic member 26 is sleeved on the guiding rod. 25.

The working principle of this embodiment is similar to that of embodiment 1, and is not repeated herein.

Embodiment 4

Figure 5:
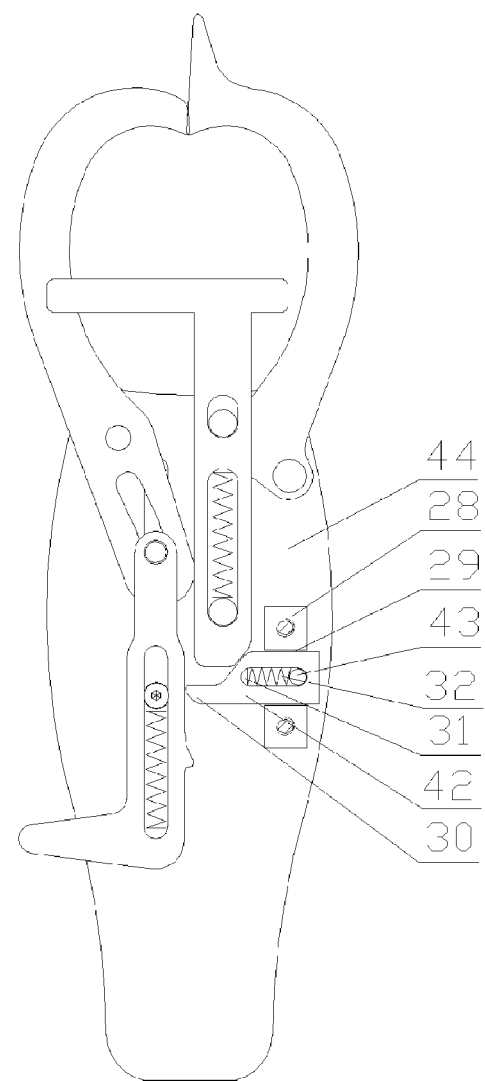
FIG. 5 is a schematic diagram showing a structure of embodiment 4.

As shown in FIG. 5, the structure of embodiment 4 is almost the same as that of embodiment 3, except that: the slidable base 28 is further provided. The guiding hole 29 is provided in the slidable base 28. One end of the locking member 42 slidably passes through the guiding hole 29, and the fixture hook 30 is connected to the other end of the locking member 42. The locking pin 43 and the fifth sliding groove 31 that cooperate with each other are provided between the locking member 42 and the base 44. The second elastic member 32 is a compression spring, and is connected between the inner end of the limiting pin 43 and the inner end of the fifth sliding groove 31.

The working principle of this embodiment is similar to that of embodiment 1, and is not repeated herein.

Embodiment 5

Figure 6:
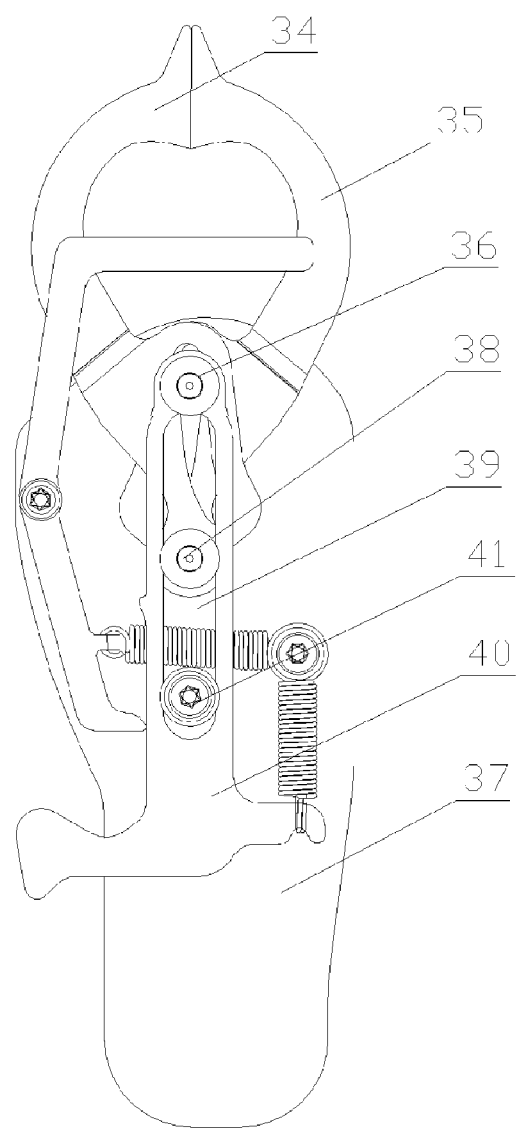
FIG. 6 is a schematic diagram showing a structure of embodiment 5.

As shown in FIG. 6, embodiment 5 is different from embodiment 1 in that: the left gripper 34 and the right gripper 35 are both movable gripping heads. The left gripper 34 and the right gripper 35 are connected to the base 37 through the rotating shaft 36. The sixth sliding groove (not shown in the figure) that cooperates with the rotating shaft 36 is provided on base 37. The connecting shaft 38 is provided on the base 37 at the rear ends of the left gripper 34 and the right gripper 35. The third sliding groove 39 extending forward is provided on the trigger 40 on the rear side of the connecting shaft 38. The connecting shaft 38 is fitted and provided in the third sliding groove 39. The front end of the trigger 40 is connected to the rotating shaft 36. The second guiding pin 41 fitted in the third sliding groove 39 is provided on the base 37.

During use, when the trigger 40 is pulled backward, the left gripper 34 and the right gripper 35 are opened under the action of the connecting shaft 38 and the third sliding groove 39.

The structures of the locking member and the triggering member in this embodiment are the same as those of the above embodiments, and details are not repeated herein.

What is claimed is:

1. A fish grip having a touch control locking mechanism, comprising: a base, wherein a front end of the base is provided with a left gripper and a right gripper, the left gripper and the right gripper cooperate with each other, a trigger for opening the left gripper and the right gripper is further connected in the base, and a first elastic member is provided between the trigger and the base to drive the left gripper and the right gripper to close automatically;

the base is further movably connected to a locking member for locking the trigger when the left gripper and the right gripper are in an open position, a second elastic member is connected between the locking member and the base, and the second elastic member is configured to keep the locking member in a position of locking the trigger; and a triggering member is further connected in the base, and the triggering member is configured to automatically trigger the locking member to reset the trigger under an action of the first elastic member after the left gripper or right gripper reaches into a fish mouth and the triggering member is moved, thereby closing the left gripper and the right gripper;

wherein a fixture hook and a fixture block that cooperate with each other are provided between the locking member and a side wall of the trigger, the fixture hook is provided on the locking member, the fixture block is arranged on the side wall of the trigger, and the fixture hook cooperates with the fixture block under an action of the second elastic member; and when the left gripper and the right gripper are in the open position, the fixture hook is hooked on the fixture block to keep the left gripper and the right gripper in the open position.

2. The fish grip having the touch control locking mechanism according to claim 1, wherein the locking member is rotationally connected in the base through a fourth bolt, the triggering member is L-shaped, and a vertical section of the triggering member and a front end of the locking member form an integrated structure, a horizontal section of the triggering member is horizontally provided on a side of the left gripper or a side of the right gripper, when the left gripper or the right gripper is extended into the fish mouth, the horizontal section of the triggering member is rotated to separate the fixture hook and the fixture block engaged with each other.

3. The fish grip having the touch control locking mechanism according to claim 1, wherein the locking member is horizontally movably connected in the base, the triggering member is L-shaped, a horizontal section of the triggering member is horizontally provided on a side of the left gripper or a side of the right gripper, when the left gripper or the right gripper extends into the fish mouth, a vertical section of the triggering member is pushed to push the locking member downward to move out laterally to separate the fixture hook and the fixture block engaged with each other.

4. The fish grip having the touch control locking mechanism according to claim 1, wherein the locking member is rotationally connected in the base through a fourth bolt, the triggering member is L-shaped and is slidably mounted in the base through a fourth sliding groove and a third guiding pin, wherein the fourth sliding groove and the third guiding pin cooperate with each other, an end of the triggering member abuts against the locking member backward, a horizontal section of the triggering member is horizontally provided on a side of the left gripper or a side of the right gripper, when the left gripper or the right gripper extends into the fish mouth, the horizontal section of the triggering member is pushed backward to make the locking member rotate to separate the fixture hook and the fixture block engaged with each other; a third elastic member to reset forward is provided between the triggering member and the base.

5. A fish grip having a touch control locking mechanism, comprising: a base, wherein a front end of the base is provided with a left gripper and a right gripper, the left gripper and the right gripper cooperate with each other, a trigger for opening the left gripper and the right gripper is further connected in the base, and a first elastic member is provided between the trigger and the base to drive the left gripper and the right gripper to close automatically;

the base is further movably connected to a locking member for locking the trigger when the left gripper and the right gripper are in an open position, a second elastic member is connected between the locking member and the base, and the second elastic member is configured to keep the locking member in a position of locking the trigger; and a triggering member is further connected in the base, and the triggering member is configured to automatically trigger the locking member to reset the trigger under an action of the first elastic member after the left gripper or right gripper reaches into a fish mouth and the triggering member is moved, thereby closing the left gripper and the right gripper;

wherein the left gripper is a fixed gripping head, and the right gripper is a movable gripping head or the right gripper is the fixed gripping head, and the left gripper is the movable gripping head; and wherein a middle portion of the trigger is provided with a first sliding groove extending forward, a first guiding pin cooperating with the first sliding groove is provided on the base, a second bolt is connected to a front end of the trigger, a second sliding groove extending forward is provided on the base, an arc-shaped groove is provided on the movable gripping head, and the second bolt slidably cooperates with the second sliding groove and the arc-shaped groove simultaneously.

6. The fish grip having the touch control locking mechanism according to claim 5, wherein a fixture hook and a fixture block that cooperate with each other are provided between the locking member and a side wall of the trigger, the fixture hook is provided on the locking member, the fixture block is arranged on the side wall of the trigger, and the fixture hook cooperates with the fixture block under an action of the second elastic member; and when the left gripper and the right gripper are in the open position, the fixture hook is hooked on the fixture block to keep the left gripper and the right gripper in the open position.

7. The fish grip having the touch control locking mechanism according to claim 6, wherein the locking member is rotationally connected in the base through a fourth bolt, the triggering member is L-shaped, and a vertical section of the triggering member and a front end of the locking member form an integrated structure, a horizontal section of the triggering member is horizontally provided on a side of the left gripper or a side of the right gripper, when the left gripper or the right gripper is extended into the fish mouth, the horizontal section of the triggering member is rotated to separate the fixture hook and the fixture block engaged with each other.

8. The fish grip having the touch control locking mechanism according to claim 6, wherein the locking member is horizontally movably connected in the base, the triggering member is L-shaped, a horizontal section of the triggering member is horizontally provided on a side of the left gripper or a side of the right gripper, when the left gripper or the right gripper extends into the fish mouth, a vertical section of the triggering member is pushed to push the locking member downward to move out laterally to separate the fixture hook and the fixture block engaged with each other.

9. The fish grip having the touch control locking mechanism according to claim 6, wherein the locking member is rotationally connected in the base through a fourth bolt, the triggering member is L-shaped and is slidably mounted in the base through a fourth sliding groove and a third guiding pin, wherein the fourth sliding groove and the third guiding pin cooperate with each other, an end of the triggering member abuts against the locking member backward, a horizontal section of the triggering member is horizontally provided on a side of the left gripper or a side of the right gripper, when the left gripper or the right gripper extends into the fish mouth, the horizontal section of the triggering member is pushed backward to make the locking member rotate to separate the fixture hook and the fixture block engaged with each other; a third elastic member to reset forward is provided between the triggering member and the base.

* * * * *